UNITED STATES PATENT OFFICE.

WOOTSON L. SANDERSON, OF MERIDIAN, MISSISSIPPI.

ARTIFICIAL STONE OR BRICK.

1,376,464.     Specification of Letters Patent.     Patented May 3, 1921.

No Drawing.     Application filed June 30, 1920. Serial No. 393,137.

*To all whom it may concern:*

Be it known that I, WOOTSON L. SANDERSON, a citizen of the United States, residing at Meridian, in the county of Lauderdale and State of Mississippi, have invented certain new and useful Improvements in Artificial Stone or Bricks; and I do hereby declare the following to be a full, clear, and exact description of the invention, such as will enable others skilled in the art to which it appertains to make and use the same.

The present invention relates to artificial stone and brick, and aims to provide a plastic composition composed of novel mixture or ingredients, providing a product closely imitating sand stone, which is almost if not practically water proof, and which will resist fire, water and climatic conditions equal to or better than the natural stone.

In carrying out the invention, the following proportional formula is used:

| | |
|---|---|
| 5 cubic feet | Perfect dry sand, sand clay or any good building sand, dried by sunshine and air without artificial drying by heat or steam. |
| 3¾ pounds | Red oxid of iron. |
| 2½ pounds | Builders' plaster of Paris. |
| 1¾ pounds | American or any suitable yellow ocher. |
| 1¼ pounds | Common pure fine salt. |
| 10 ounces | Pure granulated sugar or its equal in good syrup of any kind. |
| 95 pounds | Portland cement. |

The ingredients above given are mixed perfectly while in a dry state, and after being thoroughly mixed, seven and one-half gallons of clean water are added and mixed thoroughly. After thoroughly mixing the ingredients with the water, until the dampness is equal and perfect throughout the mixture, showing no spots that are drier or damper than others, to assure of equal distribution of water throughout the mixture, the material is left standing for a period of one hour, after which the material can be molded into bricks or blocks suitable for building purposes, and in any size, shape or fashion, to meet the demands of modern architecture and circumstances.

The bricks or blocks are then cured. Thus, when the bricks or blocks have been taken out or emptied from the molds or forms, the blocks are placed on pallets or other supports within a shed or other shady place out of the sunshine for three days. The blocks are then sprayed lightly with clean water three times a day, morning, noon and night, for a period of ten days. Then, the blocks are sprinkled lightly with water for a period of five days twice a day, noon and night. This makes a total of fifteen days that the material, after being molded, must remain in the shed or under protection from the sunshine and weather, before the product can be placed outside, to exposure to the elements.

After the fifteen day curing period, the blocks are then placed in the open, subject to rain, sunshine, freezing and other climatic conditions, without damage. In thirty days, the blocks are ready for light building work, and in sixty days, they are ready for any kind of building.

When the blocks or bricks are being cured and treated with water, they are stacked up in the shed in such a way as to leave air spaces between them, whereby the water can be sprayed conveniently over the bricks, and the bricks or blocks are similarly stacked out in the open while aging.

The combination of materials used makes a close imitation of sand stone, and when mixed and molded into blocks or bricks, as stated above, the first setting that is done forms a shell on the exterior, and the material sets and hardens from the exterior to the center, one course or layer of hardening following another from the outside in, just the same as in the natural stone. During the treatment of the blocks with water, they must not be flooded with water, or else they will crack, and if the directions are followed closely, the resultant product will closely resemble the natural stone as drawn from natural resources.

The amount of material specified will make five cubic feet of solid stone or about one hundred solid brick of universal or standard size. When made by this process, at the age of from sixty to ninety days, the brick are almost if not practically water proof, and will resist fire, water, and climatic conditions equal to or better than the natural stone.

The color of the brick or stone is light pink, dark pink, brown or chocolate, governed by the sand used. If the sand is white, the brick or stone will be light pink. If the sand is light red, the brick or stone will be dark pink. If the sand is dark red or brown, the brick or stone will be brown or chocolate, respectively. The color is absolutely lasting, as it is a part of the stone or brick itself.

Having thus described the invention, what is claimed as new is:—

Artificial stone including, in approximately the proportions stated, 5 cubic feet of sand, $3\frac{3}{4}$ pounds red oxid of iron, $2\frac{1}{2}$ pounds plaster Paris, $1\frac{1}{4}$ pounds of ocher, $1\frac{1}{4}$ pounds of salt, 10 ounces of sugar, and 95 pounds of cement.

In testimony whereof I have signed my name to this specification in the presence of two subscribing witnesses.

WOOTSON L. SANDERSON.

Witnesses:
C. L. HUGHES,
E. L. GASTON.